73-671
9/21/82    XR    4,350,043    SR

United States Patent [19]
Jones

[11] 4,350,043
[45] Sep. 21, 1982

[54] AIRFOIL VIBRATION TEST APPARATUS

[75] Inventor: Carmen B. Jones, West Chester, Ohio

[73] Assignee: The United States of America as represented by the Secretary of the Air Force, Washington, D.C.

[21] Appl. No.: 212,956

[22] Filed: Dec. 4, 1980

[51] Int. Cl.³ .............................................. G01H 13/00
[52] U.S. Cl. ........................................ 73/579; 73/671
[58] Field of Search ................. 73/671, 662, 577, 579, 73/583

[56] References Cited

U.S. PATENT DOCUMENTS

| | | | |
|---|---|---|---|
| 2,575,710 | 11/1951 | Hardigg | 73/660 |
| 2,682,167 | 6/1954 | Gamarekian | 73/671 |
| 2,756,416 | 7/1956 | Griparis | 340/405 |
| 3,023,610 | 3/1962 | Prochazka | 73/583 |
| 3,416,628 | 12/1968 | Bschorr et al. | 181/142 |
| 4,012,952 | 3/1977 | Dory | 73/660 |
| 4,019,375 | 4/1977 | Ellis et al. | 73/662 |
| 4,043,176 | 8/1977 | Graham | 73/1 DV |

*Primary Examiner*—Stephen A. Kreitman
*Attorney, Agent, or Firm*—Donald J. Singer; Jacob N. Erlich

[57] ABSTRACT

An apparatus for inducing high frequency out-of-phase, vibrations in adjacent span-wise panel portions of a plate type structure, such as an airfoil blade of a gas turbine engine. The apparatus includes a novel bifurcated duct for conducting and directing two out-of-phase streams of gaseous flow, and a uniquely structured air chopper which generates the two out-of-phase gaseous streams. The duct has an upstream end with which the output of the air chopper is in communication, and a stepped-down downstream end at which the airfoil blade (or other plate type structure specimen that is to be tested) is held, supported, and positioned in a chord-wise direction, such that the two out-of-phase gaseous streams impinge upon, and induce the same high frequency vibration in, two preselected, adjacent, span-wise panel portions of the specimen, thereby the panel portions vibrate out-of-phase.

12 Claims, 4 Drawing Figures

AIRFOIL VIBRATION TEST APPARATUS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to an apparatus for inducing vibrations in a plate type structure and, more particularly, to an airfoil blade, such as is used in various components of a gas turbine engine.

A prime cause of airfoil blade failures occuring during testing and development programs has been, and remains, the response of the airfoil blade to chordwise bending modes resulting from gaseous flow impingement during rotor blade/stator blade passing excitation. These "striped-mode" responses are characterized by nodal patterns on the airfoil blade resulting in relatively large panel sections, continuous in the span-wise direction, vibrating at frequencies higher than the primary airfoil blade excitation modes.

In addition, recent engine test experience has taught that second order of a blade or vane passing integer order of excitation of these modes is of aero-mechanical interest.

Further, mechanical developments of airfoil blades will be significantly more straightforward if vibratory fatigue tests to crack inception can be conducted upon airfoil blades being shaken in these modes, many of which are characteristically difficult to drive at high strain levels with prior art vibration-inducing test apparatus.

Therefore, what is needed in the art and is not presently available is apparatus capable of exciting such higher order modes to a strain level in an airfoil blade (or a plate type structure) sufficient to induce fatigue failure and to allow meaningful and repeatable vibratory strain distributions to be observed, recorded, studied, and the like.

SUMMARY OF THE INVENTION

This invention provides the capability to drive such high frequency modes than can not be attained by using prior art vibration-inducing apparatuses, fulfills the above-mentioned need, and thereby constitutes a significant advance in the state-of-the-art.

This invention increases the level of vibratory strain that can be excited in several panel section modes of vibrations that are commonly seen to occur in compressor and turbine airfoil blades and in other plate type structures.

The best known, most commonly used, and most satisfactory to use means of vibratory excitation is by an air chopper (such as a siren), and these devices are now standard laboratory tools, and this invention makes use of that fact by including in the invention a unique air chopper as a major constituent component.

Accordingly, the principal object of this invention is to provide a unique apparatus for inducing vibrations in an airfoil blade or other plate type structure.

Another object of this invention is to permit the increase of the level of vibratory strain that can be excited.

Still another object of this invention is to provide a unique air chopper which can be used to generate two gaseous flow streams (from one pressurized gaseous flow) which are exactly out of phase (i.e., ±180 degrees) with each other.

Yet another object of this invention is to attain the aforesaid objects with, and by the use of, an air chopper which is significantly different in the configuration, placement, and number of the openings used in the stator disc component, but which is economical and easy to manufacture by using existing siren manufacturing techniques and tooling.

Yet still another object of this invention is to provide a novel means for conducting and directing the two out-of-phase gaseous flow streams, such that each forms a desired pressure pattern on a test specimen airfoil blade or plate type structure, from the air chopper to the specimen, whereby two adjacent panel portions of the test specimen are subjected to the pressure waves, rather than one panel section, as is customary in the art.

These objects of this invention, as well as other related objects of this invention, will become readily apparent after a consideration of the description of the invention, together with reference to the contents of the figures of the drawing.

DETAILED DESCRIPTION OF THE PREFERRED EMBODIMENT

Figure 1:
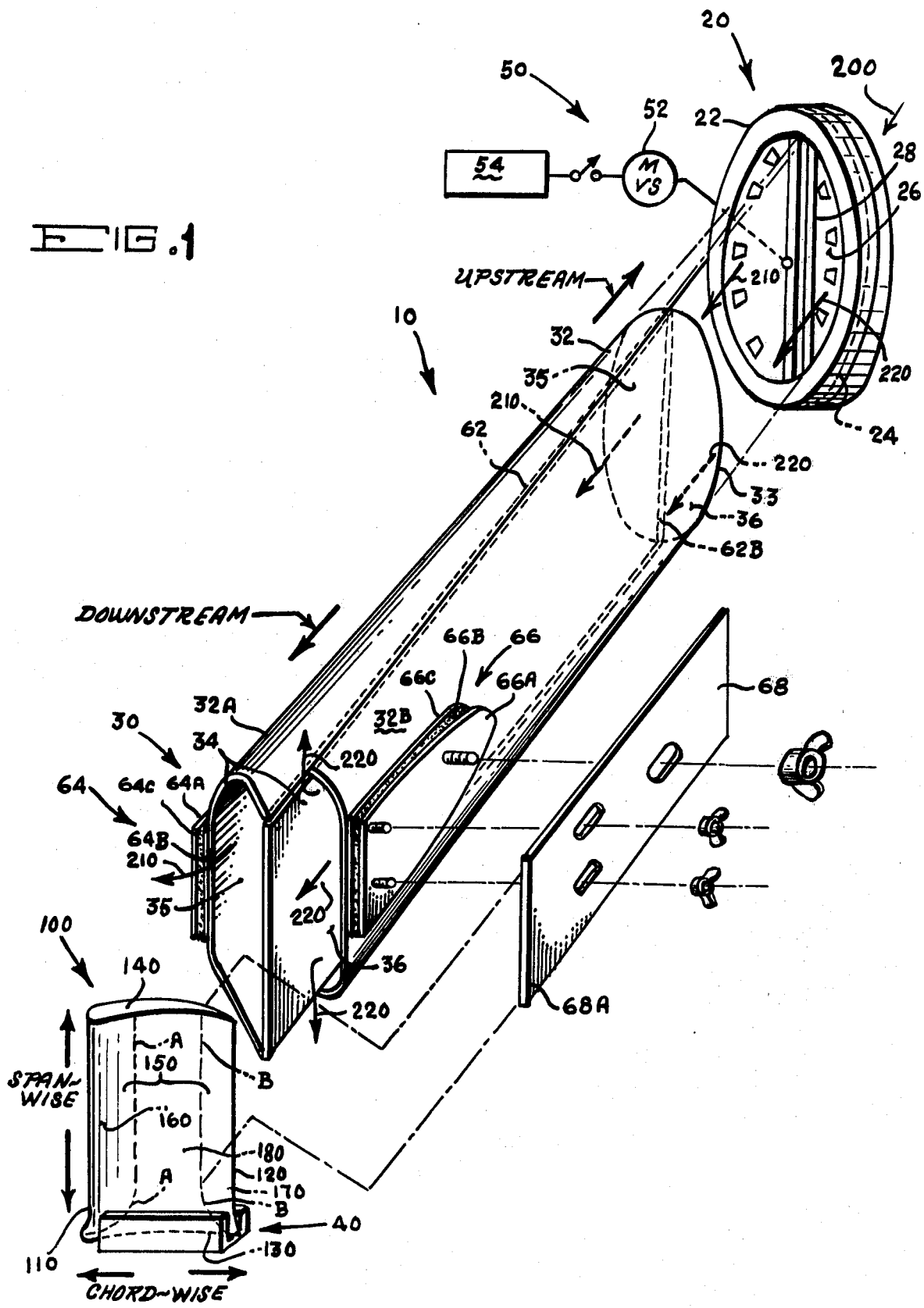
FIG. 1 is an exploded perspective view, in simplified schematic and pictorial form, of a preferred embodiment of this invention.

With reference to FIG. 1, therein is shown in an exploded view, and in simplified schematic and pictorial view, a preferred embodiment 10 of this invention in its working environment of ambient air 200 and in operation inducing vibrations in the airfoil blade test specimen 100 (i.e., a plate type structure) having a leading edge 110, a trailing edge 120, a root portion 130, a tip portion 140, and a gaseous flow impingement area 150 comprising a leading edge span-wise panel portion 160, a trailing edge span-wise panel portion 170, and an intermediate span-wise panel portion 180 therebetween.

In the most basic and generic structural form, the invention 10 comprises: (a) a source of pressurized gas (generally designated 200), such as the ambient air; (b) means 20, in communication with the source of pressurized gas 200, for selectively generating a flow of the pressurized gas 200 in two out-of-phase pressure patterns (such as are defined by the leading edge panel portion area 160 and the intermediate panel portion area 180), by dividing the pressurized gaseous flow 200 into two streams (such as 210 and 220, which hereinafter will be referred to as the "two out-of-phase pressure portion gaseous flow streams" or the like), to vibrate the airfoil blade (or plate type structure) 100; (c) means (generally designated 30) for conducting and directing the two out-of-phase pressure pattern gaseous flow streams 210 and 220 from the gaseous flow generating means 20 to the airfoil blade (or plate type structure) 100; and (d) means 40 for holding and supporting the airfoil blade (or plate type structure) 100 in alignment with the means 30 for conducting and directing the two out-of-phase pressure pattern gaseous flow streams 210 and 220, such that the streams 210 and 220 impinge upon, and induce vibration in, two adjacent panel portions (such as 160 and 170) of the airfoil blade 100.

With reference to FIGS. 1–4, inclusive, therein is shown the pressurized gaseous flow generating means 20 or components thereof. This means 20 basically includes an air chopper component 22 having a rotor member 24, FIGS. 1 and 2, upstream of a stator member 26, FIGS. 1, 3 and 4, and a means 50 for selectively rotating the rotor member 24 at any one of a plurality of preselected rates (i.e., rpm or cps). This rotor rotating means 50 includes a variable speed electric motor 52, FIG. 1, operatively connected to the rotor member 24 and a source of electrical power 54, FIG. 1, in electrical connection with the motor 52.

Figure 2:
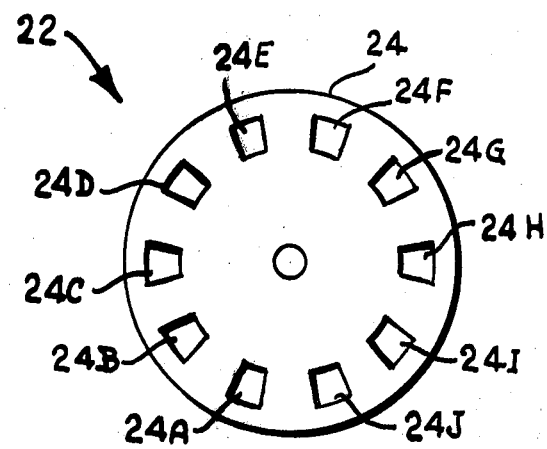
FIG. 2 is a front view in simplified schematic and pictorial form, of a preferred embodiment of the rotor disc member of the air chopper component of the invention.
Figure 3:
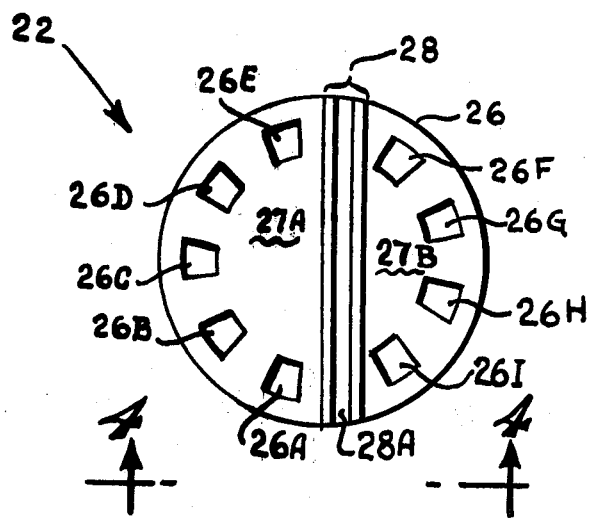
FIG. 3 is a front view, in simplified schematic and pictorial form, of a preferred embodiment of the stator disc member of the air chopper component of the invention.
Figure 4:
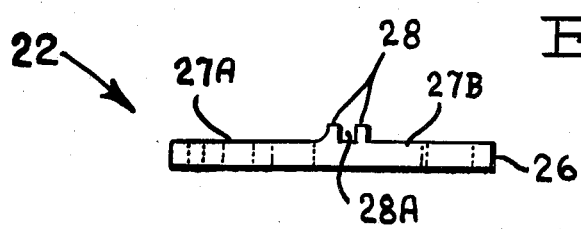
FIG. 4 is the view of the stator disc member in simplified schematic and pictorial form, as seen when viewing this member along line 4—4 in FIG. 3.

Now, with reference more particularly to FIGS. 2–4, inclusive, the rotor member 24, FIG. 2, has a plurality of preselected number of openings (such as are designated 24A–24J, inclusive, in FIG. 2) which have a predetermined configuration. The stator member 26, FIGS. 3 and 4, has a plurality of a lesser preselected number of similarly configurated openings (such as are designated 26A–26I, inclusive, in FIG. 3). The openings in the rotor member 24 and the openings in the stator member 26 are identical in configuration; and, as a matter of preference, the openings in the rotor and stator members 24 and 26 are each configurated essentially in the form of an isosceles trapezoid (i.e., a trapezoid whose legs are of equal length).

Still with reference to FIGS. 2, 3 and 4, the rotor member 24 is shaped in the form of a disc, with the plurality of openings therein 24A–24J, inclusive, being positioned circumferentially (i.e., each the same radial distance from the geometric center of the rotor member) and in equal spaced-apart relationship to each other. The stator member 26, FIGS. 3 and 4, is also shaped in the form of a disc and is sized identical to the rotor member 24, FIG. 2. However, the stator member 26, FIGS. 3 and 4, unlike the rotor member 24, has a diametric-like, off-center, protrusion 28 (with slot 28A therein) which divides the disc-shaped stator member 26 into a first half 27A of 180 degrees and a second half 27B of 180 degrees, with the second half 27B including the entire diametric-like, off-center, protrusion 28, such that the angular area left for the openings 26F–26I is less than 180 degrees. The openings 26A–26I of the stator member 26 are also positioned circumferentially (and, at the same radial distance from the geometric center as the circumferentially-positioned rotor member openings 24A–24J, inclusive), such that, when the rotor member 24 and the stator member 26 are positioned in the air chopper 22, the openings in the stator member 26 are oppositely disposed with reference to the openings in the rotor member 24, and the openings 26A–26E in the first half 27A of the stator member 26 can be (and, at same time during rotation of the rotor member 24 will be) in registration with a corresponding number of adjacent openings in a corresponding one half (i.e., 180 degrees) of the rotor member 24. However, it is to be noted, that the openings 26F–26I in the second half 27B of the stator member 26 are fewer in number than, and are positioned one half a pitch away from, the openings on the corresponding one half of the rotor member 24. Stated another way, if (for illustrative purposes) the rotor member 24 has ten openings therein, then five openings are in one half of the rotor member 24 and the other remaining five openings are in the other half of the rotor member 24; and, if the stator member 26 has nine openings therein, then five of the openings will be in one half 27A of the stator member 26, and the other remaining four openings (such as 26F–26I, inclusive) will be (along with the diametric-like, off-center, protrusion 28) in the other one half 27B of the stator member 26.

Now, with reference back to FIG. 1, the means 30, that is connected to the pressurized gaseous flow generating means 20, for conducting and directing the two out-of-phase pressure pattern streams 210 and 220 of gaseous flow from the pressurized gaseous flow generating means 20 to the specimen airfoil blade (or plate type structure) 100 includes a bifurcated duct means which further includes: (a) a duct member 32 having an upstream end 33 to which the air chopper component 22 is connected (such that the output of the air chopper 22 is in communication with the upstream end 33 of the duct member 22), and a stepped (i.e., stepped-down or stepped-in) downstream end 34 opposite which the airfoil blade (or plate type structure) 100 is positioned; and (b) means for defining and maintaining two separate and distinct gaseous flow paths (such as 35 and 36), within the duct member 32, that are of equal length and of equal cross section, and with this means also for damping vibrations of the duct member 32 which may occur because of the pressurized gaseous flow (of streams 210 and 220) in the duct member 32. It is here to be noted that the duct member 32 has external side surfaces (such as 32A and 32B).

Still with reference to FIG. 1, and more specifically with regard to the means for defining and maintaining the two separate gaseous flow paths 35 and 36 in the duct member 32 and for damping vibration of the duct member 32, this means includes: (a) a bulkhead material 62 that is disposed within the duct member 32 and extends from the upstream end 33 of the duct member 32 to the stepped downstream end 34 of the duct member 32, such that the duct member 32 is divided into a first and a second approximately equal volumetric portions (designated 35 and 36, since these portions are, in fact, the flow paths); (b) a multi-layered first cheek component 64 comprising a first metal member 64A having a thickness, a second metal member 64B having a greater thickness than the first metal member 64A, and a sheet member 64C that is made of a high-hysteresis elastomer (such as a urethane elastomer composed of "Adpprene L167" that is catalyzed by "Caytur 21") that is interposed between and bonded to the first and second metal member 64A and 64B, with this multi-layered first cheek component 64 attached to an external side surface 32A of the first volumetric portion 35 of the duct member 32, at the downstream end 34, in a position that is essentially parallel to the bulkhead member 62; (c) a multi-layered second cheek component 66 structured to the multi-layered first cheek component 64 and configurated symmetrical to it, with this second cheek component 66 attached to the external side surface 32A of the second volumetric portion 36 of the duct member 32 at the stepped-in portion of the stepped downstream end 34, in a position that is essentially parallel to the bulkhead member 62 and to the multi-layered first cheek component 64; and (d) a cheek plate component 68 that is removably connected to the multi-layered second cheek component 66 and that is slidably movable farther downstream than the stepped-in portion (i.e., the portion through which the stream 220 flows) of the stepped downstream end 34 of the duct member 32.

Still with reference to FIG. 1, the means 40 for holding and supporting the test specimen airfoil blade (or plate type structure) 100 in alignment with, and at the stepped-in downstream end 34, of the means 30 for conducting and directing the two out-of-phase pressure pattern streams 210 and 220 of pressurized gaseous flow 200 is shown therein in simplified schematic form. The means 40 is, and can be, any conventional means useable for holding a test specimen of a plate type structure or of an airfoil blade 100. It is to be noted that the means 40 is used to hold the airfoil blade 100 in a chord-wise direction by the root portion 130, with the tip portion 140 up, and with the gaseous flow impingement surface 150 of the airfoil blade 100 facing the stepped downstream end 34 of the duct member 32 (and, of course, the downstream edge 62A of the bulkhead member 62), and with the leading edge 110 of the airfoil blade 100 extending beyond the first cheek component 64 and the trailing edge 120 of the airfoil blade 100 extending beyond the second cheek component 66 and also beyond the slidably movable cheek plate component 68, such that the pressurized gaseous flow stream 210 will impinge upon the leading edge span-wise panel portion 160, and such that the pressurized gaseous flow stream 220 will impinge upon the intermediate span-wise panel portion 180.

MANNER OF OPERATION AND OF USE OF PREFERRED EMBODIMENT

The manner of operation and of use of the invention 10, FIG. 1, can be easily ascertained by any person of ordinary skill in the art from the foregoing description, coupled with reference to the contents of the Figures of the drawing.

For others, the following simplified explanation is given. When the test specimen 100 of the plate type structure (i.e., the airfoil blade) is positioned as it is in FIG. 1, the gaseous flow impingement area 150 of the airfoil blade 100 is as close as possible to the downstream edge 62A of the bulkhead member 62 at the nodal line A—A without actually touching that line. It is here to be noted that nodal lines (i.e., lines which define a plurality of points where there is no vibration) on a specimen are determined, or are selected, prior to testing the specimen and are traced thereon. Then, the air chopper component 22 is turned on; and, because of the unique structure of the stator member 26 (the slot 28A of which fits on and is in contact with the upstream edge 62 of the bulkhead member 62), and of the configuration of the openings in both the rotor and stator members 24 and 26, the ambient air gaseous air flow 200 is outputted by the air chopper component 22 (which is a significantly modified siren) in two gaseous flow stream 210 and 220, which are out-of-phase with each other by 180 degrees, and which enter into, and flow out of, respective flow path portions 35 and 36 of duct member 32. To optimize this out-of-phase relationship of stream 210 and 220, the specimen 100 is moved angularly about the axis defined by nodal line A—A until maximum response of the specimen 100, to the stream 220, is attained. This maximum response can be determined by a number of conventional methods and means, including the use of a dynamic strain gage (not shown) on the specimen 100. When this maximum response is attained, the cheek plate component 68 is slidably moved so that the edge 68A of the plate 68 is positioned as closely as possible to, but is not touching, the airfoil structure 150 along nodal line B—B.

As a result, the intermediate span-wise panel portion 180, which is vertically bounded by nodal lines A—A, and B—B and upon which gaseous stream flow 220 impinges, vibrates 180 degrees out-of-phase with the vibrating leading edge span-wise panel portion 160, with both span-wise panel portions 160 and 180 vibrating at the same very high frequency.

CONCLUSION

It is abundantly clear from all of the foregoing, and from the contents of the Figures of the drawing, that the stated objects of this invention, as well as related objects thereof, have been achieved.

It is to be noted that, although there have been described and shown the fundamental and unique features of my invention as applied to a preferred embodiment, various other embodiments, variations, adaptations, substitutions, additions, omissions, and the like, may occur to, and can be made by, those of ordinary skill in the art, without departing from the spirit of this invention. For example, although this invention for illustrative purposes has been described in use inducing vibrations in an airfoil blade (or plate type structure) in a "two-stripe" mode (i.e., a two panel portion excitation), this invention can be used to excite all panel portion modes that are characterized by relatively long, essentially parallel panel portions which are aligned in the span-wise direction.

What is claimed is:

1. An apparatus for inducing vibrations in a plate type structure, comprising:
   a. a source of pressurized gas;
   b. means, in communication with said source of pressurized gas, for selectively generating a flow of said pressurized gas in two out-of-phase pressure pattern streams of gaseous flow;
   c. means, connected to said pressurized gaseous flow generating means, for conducting and directing said two out-of-phase pressure pattern streams of gaseous flow from said pressurized gaseous flow generating means to said plate type structure;
   d. and, means for holding and supporting said plate type structure in alignment with said means for conducting and directing said two out-of-phase pressure pattern streams of gaseous flow, such that said streams impinge upon, and induce vibrations in, two adjacent portions of said plate type structure.

2. An apparatus, as set forth in claim 1, wherein said source of pressurized gas is ambient air.

3. An apparatus, as set forth in claim 1, wherein said pressurized gaseous flow generating means includes:
   a. an air chopper component having a rotor member upstream of a stator member, with said rotor member having a plurality of a preselected number of openings which have a predetermined configuration, and with said stator member having a plurality of a lesser preselected number of similarly configurated openings;
   b. and, means for selectively rotating said rotor member at any one of a plurality of preselected rates.

4. An apparatus, as set forth in claim 3, wherein said openings in said rotor member are identical, and said openings in said stator member are identical to said openings in said rotor member.

5. An apparatus, as set forth in claim 4, wherein said openings in said rotor member and in said stator member are each configured essentially in the geometric form of an isosceles trapezoid.

6. An apparatus, as set forth in claim 5, wherein:
   a. said rotor member is shaped in the form of a disc, with said plurality of openings therein positioned circumferentially and in equal spaced apart relationship to each other;
   b. and, said stator member is shaped in the form of a disc sized identical to said rotor disc member and having a slotted diametric-like off-center protrusion which divides said stator member into a first half and a second half, with said plurality of openings in said stator member positioned circumferentially and oppositely disposed with relationship to said openings in said rotor member, and with said openings in said first half of said stator member concurrently disposed such that they can be in registration with a corresponding number of adjacent openings in a corresponding one half of said rotor member, and also with said openings in said second half of said stator member being fewer in number than, and being positioned one half pitch away from, said openings on the corresponding one half of said rotor member.

7. An apparatus, as set forth in claim 6, wherein said rotor disc member has ten isosceles trapezoidal openings therein, with five of said openings being in each said half of said rotor disc member, and wherein said stator disc member has nine isosceles trapezoidal openings therein, with five of said openings in said first half of said stator disc member and with four of said openings in said second half of said stator disc member.

8. An apparatus, as set forth in claim 3, wherein said means for selectively rotating said rotor disc member to any one of a plurality of preselected rotational rates includes:
   a. a variable speed electric motor operatively connected to said rotor member;
   b. and, a source of electrical power in electrical connection with said variable speed electric motor.

9. An apparatus, as set forth in claim 3, wherein said means for conducting and directing said two out-of-phase pressure pattern streams of gaseous flow from said pressurized gaseous flow generating means includes a bifurcated duct means which further includes:
   a. a duct member having an upstream end to which said air chopper component is connected and a stepped downstream end opposite which said plate type structure is positioned;
   b. and, means for defining and maintaining two separate and distinct gaseous flow paths, within said duct member, of equal length and cross section, and for damping vibrations of said duct member which may occur because of said pressurized gaseous flow in said duct member.

10. An apparatus, as set forth in claim 9, wherein said duct member has external side surfaces, and wherein said means for defining and maintaining two separate gaseous flow paths in said duct member and for damping vibrations of said duct includes:
   a. a bulkhead member disposed within said duct member and extending from said upstream end of said duct member to said stepped downstream end of said duct member, such that said duct member is divided into first and second approximately equal volumetric portions;
   b. a multi-layered first cheek component comprising a first metal member having a thickness, a second metal member having a greater thickness than said first metal member, and a sheet member made of a high-hysteresis elastomer interposed between and bonded to said first and second metal members, with said multi-layered first cheek component attached to an external side surface of said first volumetric portion of said duct member at said stepped downstream end thereof, in a position essentially parallel to said bulkhead member;
   c. a multi-layered second cheek component structured identical to said multi-layered first cheek component and configurated symmetrical thereto, with said multi-layered second cheek component attached to an external side surface of said second volumetric portion of said duct member at the stepped-in portion of said stepped downstream end of said duct member, in a position essentially parallel to said bulkhead member and to said multi-layered first cheek component;
   d. and, a cheek plate component removably connected to said multi-layered second cheek component and slidably movable farther downstream than said stepped-in portion of said stepped downstream end of said duct member.

11. An apparatus, as set forth in claim 10, wherein said bulkhead member has a downstream edge, and wherein said plate type structure is an airfoil blade having a leading edge, a trailing edge, a tip portion and a root portion and a gaseous flow impingement surface comprising a leading edge span-wise panel portion, a trailing edge span-wise panel portion, and an intermediate span-wise panel portion therebetween, with said gaseous flow impingement surface of said airfoil blade bounded by said leading edge, said trailing edge, said tip portion, and said root portion of said airfoil blade, and also wherein said airfoil blade is held and supported at said root portion thereof by said holding and supporting means in a chord-wise position with said gaseous flow impingement surface of said airfoil blade facing said stepped-downstream end of said duct member and said downstream edge of said bulkhead member, and with said leading edge of said airfoil blade extending beyond said first cheek component and said trailing edge of said airfoil blade extending beyond said second cheek component and also beyond said slidably movable cheek plate component, whereby when said air chopper component is activated, then said pressurized gaseous stream of flow from said first volumetric portion of said duct member impinges upon and induces vibrations in said leading edge span-wise panel portion of said airfoil blade, and said pressurized gaseous stream of flow from said second volumetric portion of said duct member impinges upon and induces vibrations in said intermediate span-wise panel portion of said airfoil blade, thereby said leading edge span-wise panel portion and said intermediate span-wise panel portion of said airfoil blade vibrate 180 degrees out of phase with each other.

12. An apparatus, as set forth in claim 6, wherein said air chopper component is structured in the form of a siren.

* * * * *